US009233425B2

(12) United States Patent
Sunnvius et al.

(10) Patent No.: US 9,233,425 B2
(45) Date of Patent: Jan. 12, 2016

(54) MILLING TOOL AS WELL AS A MILLING INSERT

(71) Applicant: SANDVIK INTELLECTUAL PROPERTY AB, Sandviken (SE)

(72) Inventors: Ulrik Sunnvius, Gävle (SE); Anders Norstedt, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 324 days.

(21) Appl. No.: 13/752,595

(22) Filed: Jan. 29, 2013

(65) Prior Publication Data
US 2013/0195567 A1 Aug. 1, 2013

(30) Foreign Application Priority Data

Jan. 30, 2012 (SE) ........................................ 1250060

(51) Int. Cl.
B23C 5/20 (2006.01)
B23C 5/22 (2006.01)
B23C 5/06 (2006.01)

(52) U.S. Cl.
CPC . *B23C 5/205* (2013.01); *B23C 5/06* (2013.01); *B23C 5/207* (2013.01); *B23C 5/2221* (2013.01); *B23C 5/2247* (2013.01); *B23C 2200/045* (2013.01); *B23C 2200/085* (2013.01); *B23C 2200/161* (2013.01); *B23C 2200/168* (2013.01); *B23C 2200/205* (2013.01); *B23C 2200/286* (2013.01); *B23C 2200/363* (2013.01); *B23C2200/365* (2013.01); *B23C 2210/166* (2013.01); *Y10T 407/192* (2015.01); *Y10T 407/23* (2015.01); *Y10T 407/235* (2015.01)

(58) Field of Classification Search
CPC .................. Y10T 407/1924; Y10T 407/1932; Y10T 407/23; B23C 5/2221; B23C 5/2243; B23C 5/2247; B23C 2200/045; B23C 2200/081; B23C 2200/083; B23C 2200/161; B23C 2200/168; B23C 2200/206
USPC ............................................... 407/113, 42, 46
See application file for complete search history.

(56) References Cited

U.S. PATENT DOCUMENTS

2007/0292226 A1* 12/2007 Grund et al. ................... 409/131
2008/0232912 A1*  9/2008 Bhagath ......................... 407/114
(Continued)

FOREIGN PATENT DOCUMENTS

WO 2010140718 A1 12/2010
WO 2011001939 A1 1/2011

*Primary Examiner* — Sunil K Singh
*Assistant Examiner* — Alan Snyder
(74) *Attorney, Agent, or Firm* — Corinne R. Gorski

(57) ABSTRACT

In one aspect, the invention relates to a double-sided, indexable milling insert comprising two rake faces, between which there extends a circumferential clearance face that, in transition to the rake faces, together with the same, forms peripheral cutting edges. Each rake face including lock means for rotationally securing the milling insert in one of several index positions. Along the periphery of the individual rake face, a plurality of tangentially spaced-apart cutting edges are formed, which individually rise at an acute pitch angle from a first end toward a second one. A rake surface is positioned radially inside the individual cutting edge following the cutting edge by rising from a lower boundary line to a crest, via which the same transforms into a declining shoulder surface, which serves as a rotationally securing lock means. In addition, each rake face comprises individual bearing surfaces, which are situated between pairs of adjacent rake surfaces and on a different level from the same. In a further aspect, the invention also relates to a milling tool that is equipped with one or more milling inserts.

25 Claims, 13 Drawing Sheets

(56) References Cited

U.S. PATENT DOCUMENTS

Figure 3:
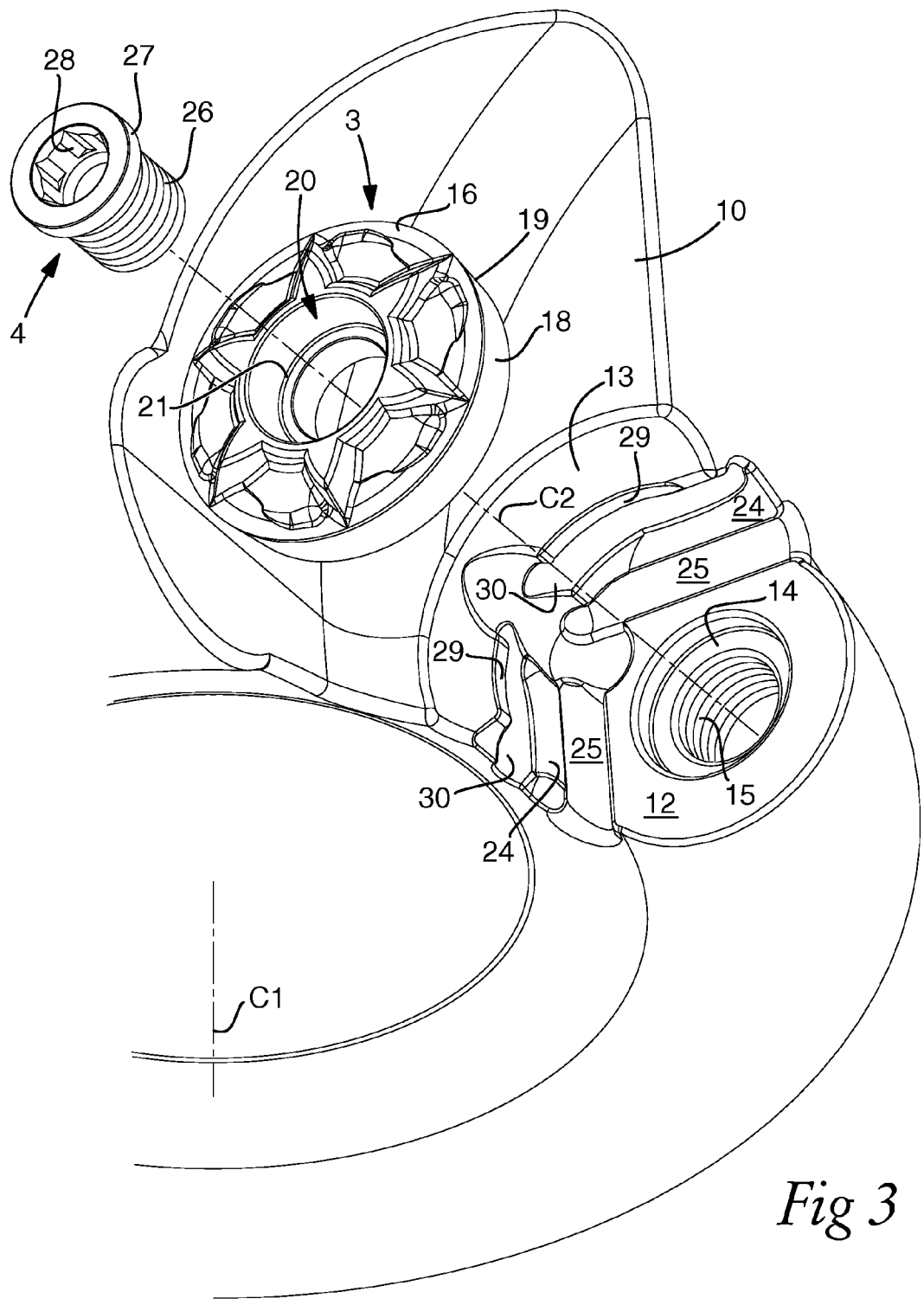

| | | |
|---|---|---|
| 2010/0202839 A1 | 8/2010 | Fang et al. |
| 2011/0081209 A1* | 4/2011 | Engstrom ................ 407/40 |
| 2011/0103905 A1 | 5/2011 | Morrison et al. |
| 2012/0070239 A1* | 3/2012 | Park et al. ................ 407/42 |
| 2012/0251250 A1* | 10/2012 | Morrison et al. ........... 407/42 |

* cited by examiner

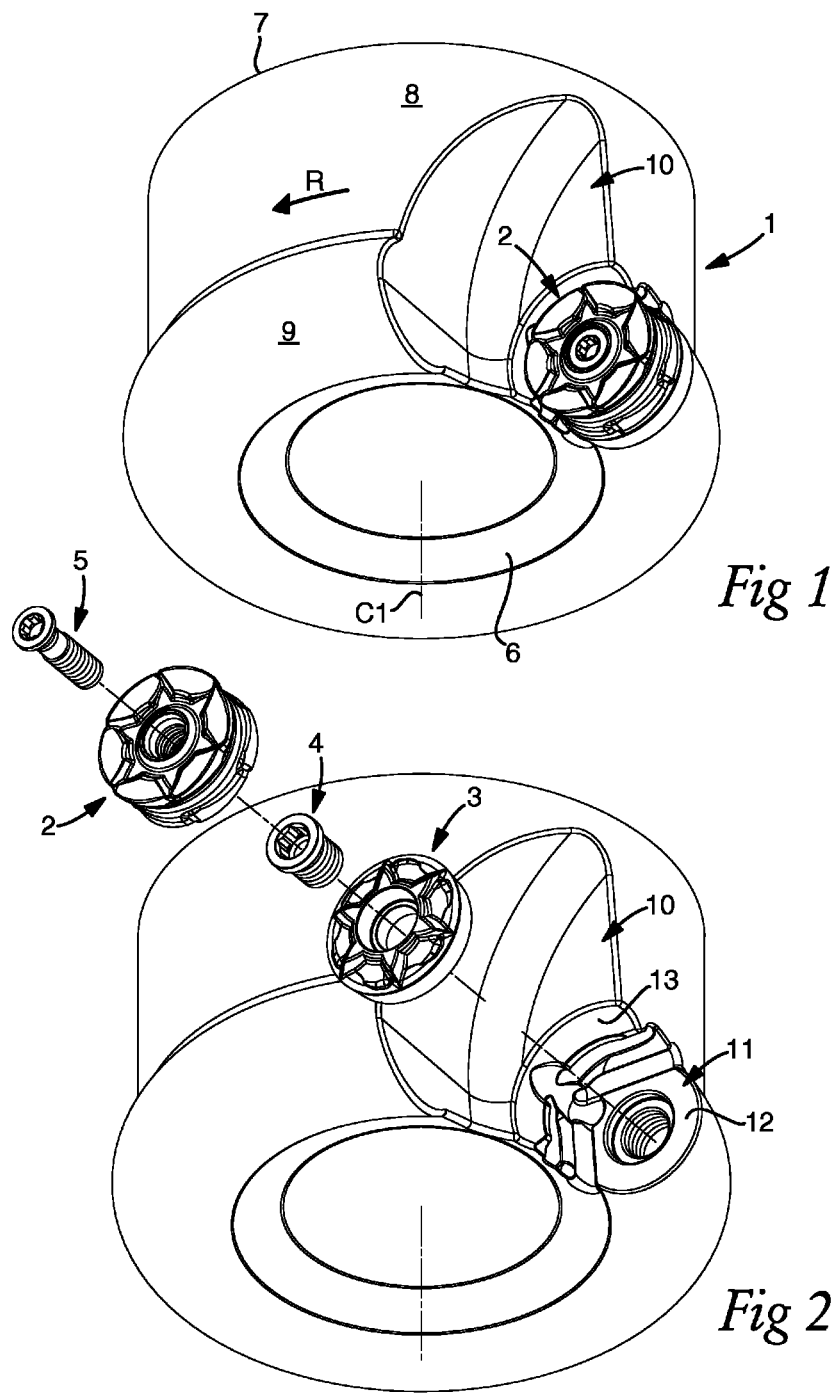

MILLING TOOL AS WELL AS A MILLING INSERT

RELATED APPLICATION DATA

This application claims priority under 35 U.S.C. §119 to Swedish Patent Application No. 1250060-9, filed on Jan. 30, 2012, which the entirety thereof is incorporated herein by reference.

TECHNICAL FIELD OF THE INVENTION

In a first aspect, this invention relates to a milling tool of the type that comprises, on one hand, a basic body that includes front and rear ends, between which there extends a centre axis on which the basic body is rotatable and with which an envelope surface is concentric, as well as a seat that is formed with a connecting surface and situated in a transition between the envelope surface and the front end, and on the other hand a double-sided, indexable milling insert comprising two chip faces separated along a centre axis and perpendicular to the same, which chip faces are equidistantly separated from a neutral plane and between which there extends a clearance face that, in transitions to the chip faces, together with the same, forms peripheral cutting edges, the connecting surface of the seat being located in a tipped-in spatial position in the basic body, in which position an axial tipping-in angle as well as a radial one are negative with the purpose of providing a clearance behind an active cutting edge of the milling insert, and the milling insert being clamped in the seat by means of a tightening device and rotationally secured in one of several index positions by means of co-operating lock means in the basic body and the milling insert.

In a second aspect, the invention relates to a double-sided and indexable milling insert suitable for milling tools and of the type that comprises two chip faces separated along a centre axis and perpendicular to the same, which chip faces are equidistantly separated from a neutral plane and between which there extends a clearance face (32) that, in transitions to the chip faces, together with the same, forms peripheral cutting edges, each chip face including lock means for rotationally securing the milling insert in one of several index positions.

BACKGROUND OF THE INVENTION

This invention has its origin in milling tools that are equipped with double-sided, indexable milling inserts, i.e., milling inserts that in one and the same body, usually of cemented carbide, include a plurality of usable cutting edges, more precisely an equally large number of identical cutting edges along each one of the two chip faces of the milling insert. In comparison with single sided milling inserts having a positive macro geometry, double-sided and invertible milling inserts may be formed with a doubled number of cutting edges. A problem of double-sided milling inserts is, however, that inactive, unused cutting edges as well as unused bearing surfaces included in the up-turned chip face, are exposed to detrimental impact from the chips that are produced by the active cutting edge indexed forward at present. If the chips removed by the active cutting edge hammer against an adjacent, unused cutting edge, there is a risk of the micro geometry of the last mentioned one, e.g. cutting edge rounding, bevel angle and bevel width, being altered in a negative way. Moreover, a possible, surface-reinforcing coating may also be damaged and partly destroyed. Hammering chips may also bore into the unused bearing surface(s) included in the up-turned chip face of the milling insert. When the milling insert then is inverted, damage of the bearing surfaces may result in the support under the active cutting edge indexed forward becoming inferior (reduced and uneven support surface), which in turn may cause bending and/or tensile stresses, which breaks the milling insert. Damage of the milling insert as a consequence of hammering chips may accordingly bring about deteriorated dimensional accuracy and surface finish of the surfaces generated in a workpiece, and result in a shortened service life of the so milling inserts of the tool so far that damaged milling inserts have to be put out of operation prematurely. The fact that the service life of different cutting edges of one and the same milling insert, as well as of different milling inserts, may vary in an uncontrolled way causes difficulties for the users who, for their production, depend on a predictable and reliable production process in which all milling inserts included in the milling tool are consumed approximately simultaneously and are suitable for replacement at one and the same occasion.

PRIOR ART

A milling insert of the type initially mentioned is previously known by US 2011/0103905. In this case, the milling insert includes a ring-shaped and plane bearing surface that is formed in the individual chip face and that is entirely situated radially inside an endless, peripheral chip surface and intended to be pressed against a central, plane support surface of a cylindrical disc in the bottom of a seat in a basic body of a tool, the milling insert being fixed by means of a tightening screw. For rotationally securing the milling insert in relation to the seat, a number of tangentially spaced-apart projections are formed along the bearing surface thereof and arranged to engage peripheral recesses in the disc in which the support surface is included. In the embodiment exemplified in the document, the number of co-operating projections and recesses amounts to six. This means that the milling insert can be indexed in six different index positions, so that six 60 degree edge segments along the circular cutting edge of one of the chip faces can be utilized for milling. After inversion of the milling insert, an additional six such edge segments can be utilized.

A disadvantage of the known milling insert is, as indicated above, precisely the fact that the bearing surface as well as the non-active edge segments are freely exposed to the chip flow emanating from the active edge segment and the direction and intensity of which may vary in an unforeseeable way and thereby damage the bearing surface as well as the unused segments of the cutting edge.

OBJECTS AND FEATURES OF THE INVENTION

The present invention aims at obviating the above-mentioned disadvantages and at providing an improved milling insert of the kind in question. Therefore, a primary object of the invention is to provide a double-sided and indexable milling insert, by means of which the chip flow can be controlled in such a way that not only one or more unused bearing surfaces included in the up-turned, active chip face of the milling insert but also the unused segments of the cutting edge along the same chip face are protected from the detrimental impact of the chip flow. A further object is to provide a milling insert that by its design allows mounting of the same in an exact spatial position in the basic body of the tool.

According to the invention, at least the primary object is attained by the fact that the milling insert is formed with a plurality of cutting edges that are tangentially spaced-apart along the periphery of the individual chip face and individually rise axially in respect of the centre axis of the milling insert at an acute pitch angle from a first end toward a second one, besides which a chip surface positioned radially inside the individual cutting edge is allowed to follow the cutting edge by rising from a lower boundary line to a crest, via which the chip surface transforms into a declining shoulder surface, which is pressable against a stop surface included in the connecting surface of the seat in order to, together with the same, form lock means, which rotationally secure the milling insert in the desired index position. Furthermore, bearing surfaces included in the chip face of the milling insert are located between pairs of adjacent chip surfaces and on another level than the same. Said bearing surfaces are pressable against support surfaces that are included in the connecting surface of the seat and formed on lugs, each one of which includes a stop surface and between which valley surfaces extend. By making the level difference between the crest of the individual chip surface and the individual bearing surface of the milling insert smaller than the level difference between the support surface on the lug and a neighbouring valley surface, the chip surfaces of the milling insert are held spaced apart from the valley surfaces of the connecting surface, when the milling insert is mounted in the seat.

By forming the tool in the above-mentioned way, it is gained that the chip flow from the active cutting edge and the chip surface thereof is directed away the adjacent, unused cutting edges as well as from the upwardly facing bearing surfaces, no which after inversion of the milling insert will abut against co-operating support surfaces of the connecting surface of the seat. In other words, the unused cutting edges and the unused bearing surfaces are protected along the upwardly facing chip face of the milling insert from the detrimental impact of the removed chips.

In one embodiment of the invention, the individual bearing surface of the milling insert is formed in adjacency to an individual shoulder surface, and is countersunk in relation to the crest between the shoulder surface and the neighbouring chip surface. In such a way, the bearing surface obtains a position well hidden and protected from the chip flow.

In one embodiment, the individual bearing surface of the milling insert may also be countersunk in relation to a lower boundary line to an adjacent chip surface. By countersinking the bearing surface further in this way, the bearing surface is distanced to an even greater extent from a passing chip flow.

In one embodiment, the individual bearing surface of the milling insert may be wedge-shaped by being delimited by boundary lines that converge toward the periphery of the chip face, besides which also the corresponding support surface of the connecting surface of the seat is wedge-shaped. In such a way, the bearing surfaces can be given an ample extension in the radial direction that guarantees a stable support of the milling insert and thereby a good resistance to the dominant cutting forces, viz. forces directed tangentially along the milling cutter body.

In one embodiment of the invention, the axial level difference between a crest included in the chip face of the milling insert and the lowest boundary line to the chip surface in which the crest is included is held within the interval of 5-15% of the thickness of the milling insert, such as this is calculated between the two opposite chip faces. By letting said level difference amount to at least 5%, it is guaranteed that the chip flow is reliably thrown out on a sufficient level above the trailing chip surface and cutting edge. By maximizing the level difference to 15%, an acceptable cutting geometry is maintained in connection with the milling operation.

In one embodiment, the individual shoulder surface of the milling insert is given a steep angle that, in arbitrary sections transverse to the crest, amounts to at most 50°. By limiting the steep angle to this value, the shoulder surface's share of the total projection area of the chip face is limited, implying that the projection area of the chip face can be utilized for the optimization of the area of the bearing surfaces.

Furthermore, the individual bearing surfaces of the milling inserts between the chip surfaces may be plane and situated in a common plane parallel to the neutral plane of the milling insert, besides which the support surfaces on the lugs of the connecting surface likewise are plane and situated in a common plane. In such a way, the support surfaces of the lugs can be manufactured with extremely good precision, viz. by grinding in just one, easily accessible plane.

Also, the milling tool according to the invention may be made with a no milling insert in which the number of individual bearing surfaces is equal to the number of chip surfaces and cutting edges, respectively, of the individual chip face, besides which the connecting surface of the seat is formed with a corresponding number of supporting lugs. In such a way, the milling insert obtains an optimum support and an optimum resistance to tangential cutting forces.

In one embodiment, the connecting surface in the seat of the basic body may be formed in an upper side of a shim plate, which is semi-permanently connected to the basic body. If the connecting surface requisite for the location of the milling insert would be damaged, e.g. in connection with an insert breakdown, the separate shim plate can easily be replaced by a new. In other words, the milling cutter body in its entirety does not need to be discarded after a breakdown.

In one embodiment exemplified in the drawings, the shim plate is fixed in the seat by means of a tubular screw that extends through a hole in the same and comprises, on one hand, a male thread, which is tightened in a female thread in a hole that mouths in a bottom in the seat, and on the other hand a female thread, in which the male thread of a tightening screw can be tightened, the tightening screw extending through a hole in the milling insert and having the purpose of clamping the downwardly facing chip face of the milling insert against the connecting surface of the shim plate. In this way, it is gained that the semi-permanently mounted shim plate can be clamped in a simple way, at the same time as the milling insert is easy to replace, more precisely by the simple measure of loosening the tightening screw from the tubular screw.

Furthermore, the shim plate may have a round basic shape and include a conical envelope surface that converges from the upper side of the shim plate toward its under side. In such a way, it is guaranteed that also the shim plate located behind the milling insert in the direction of rotation obtains a reliable clearance from the milled surface.

When the envelope surface of the shim plate is conical, the same may be formed with two plane locking surfaces that run at an angle to each other in order to be pressable against two side support surfaces that are located in the seat and run at the same angle in relation to each other. In such a way, a reliable rotational securing of the shim plate is readily obtained.

In one embodiment of the invention, the milling insert as well as the shim plate may be manufactured from cemented carbide, while the basic body is manufactured from steel. By manufacturing not only the milling insert but also the shim plate of cemented carbide, the latter obtains a good resistance to detrimental influence of pressure and heat generated in the area of the milling insert in connection with the chip-removing process. In addition, the milling insert as well as the shim plate may be given a good manufacturing precision.

BRIEF DESCRIPTION OF THE APPENDED DRAWINGS

Figure 4:
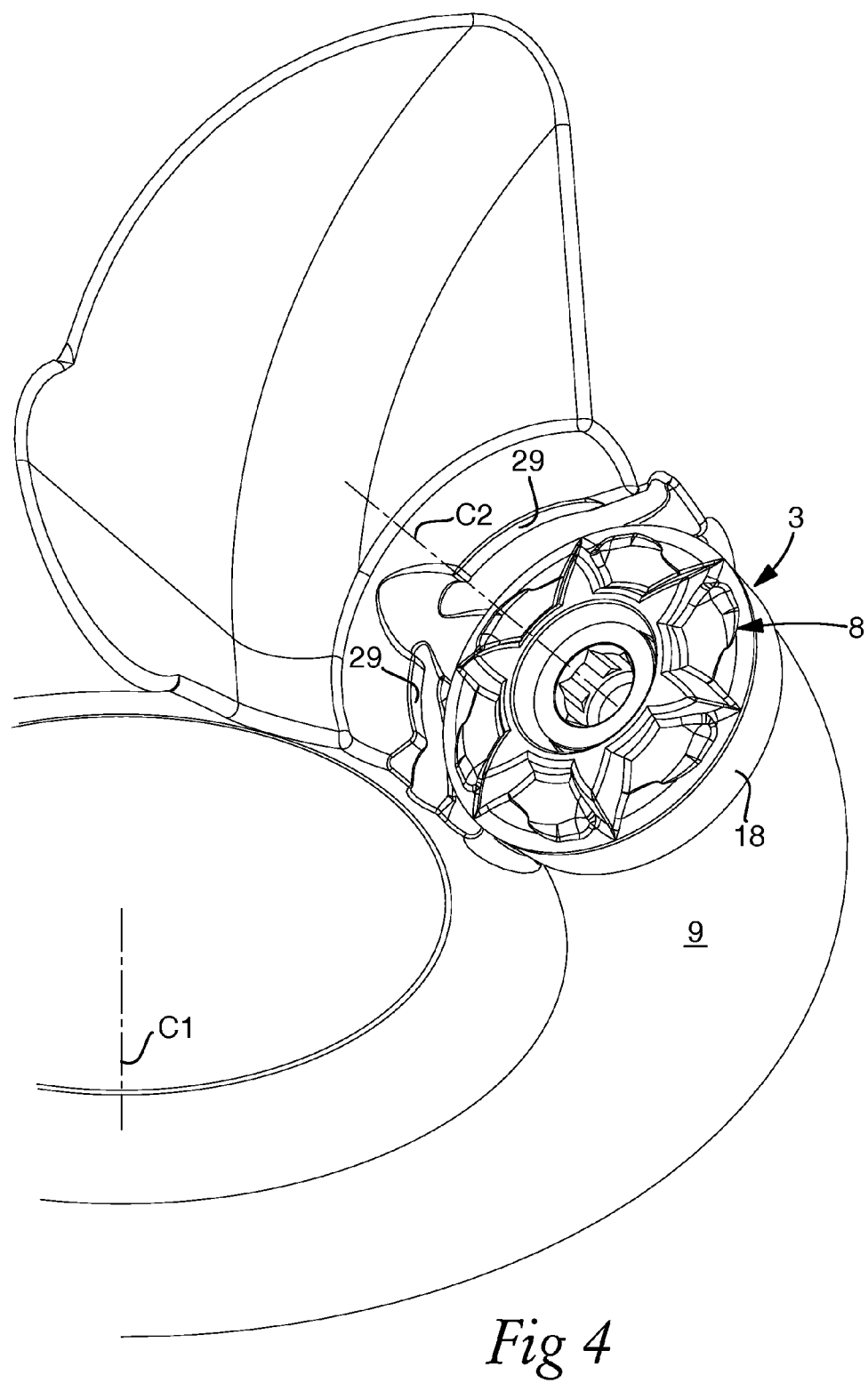
Figure 5:
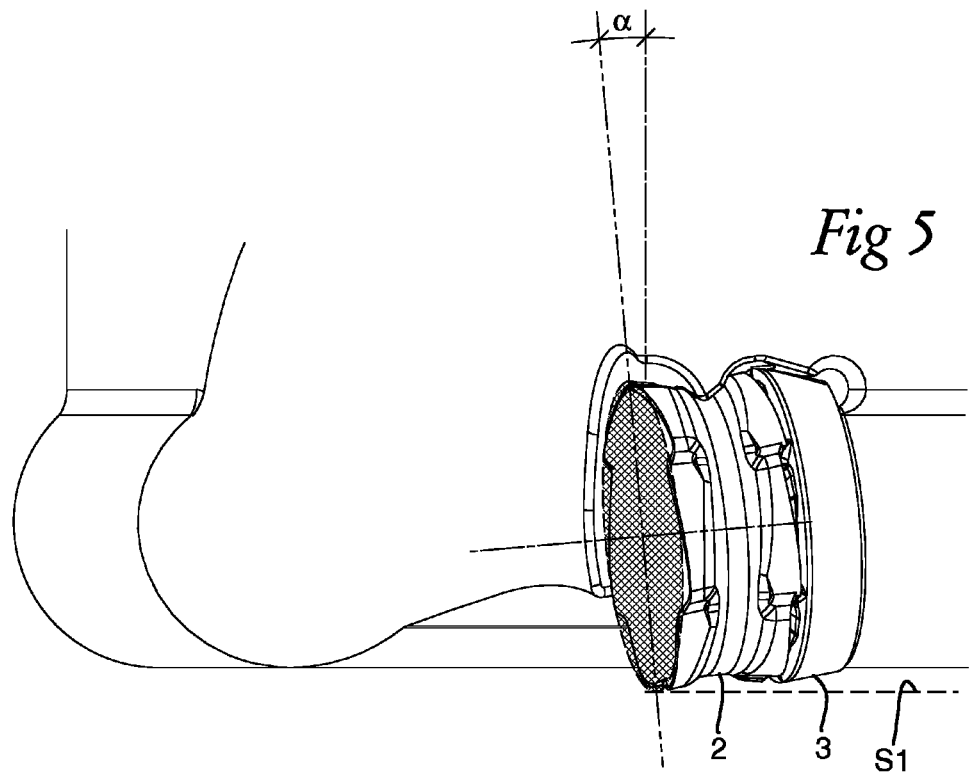
Figure 6:
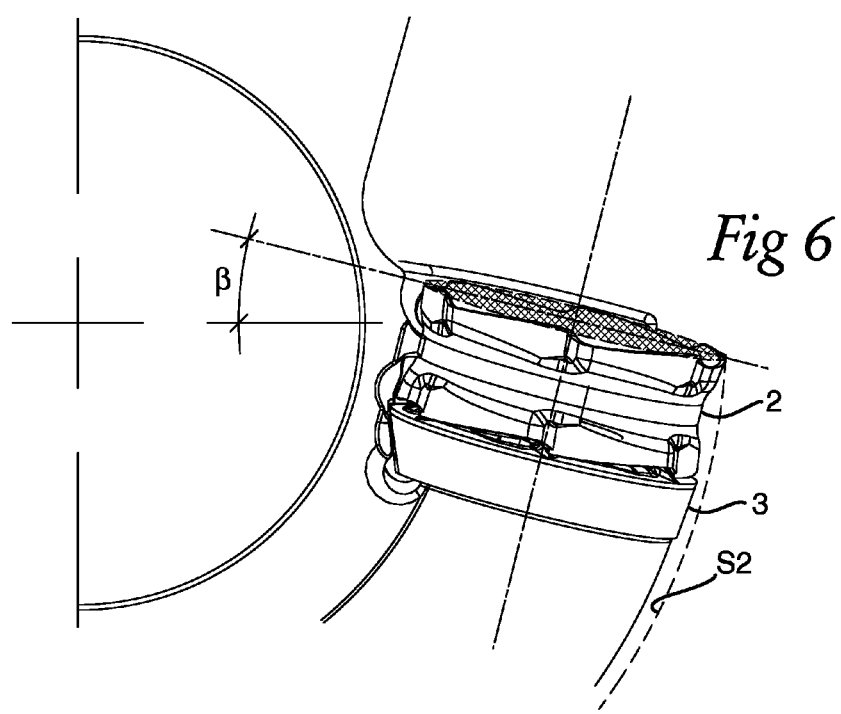
Figure 7:
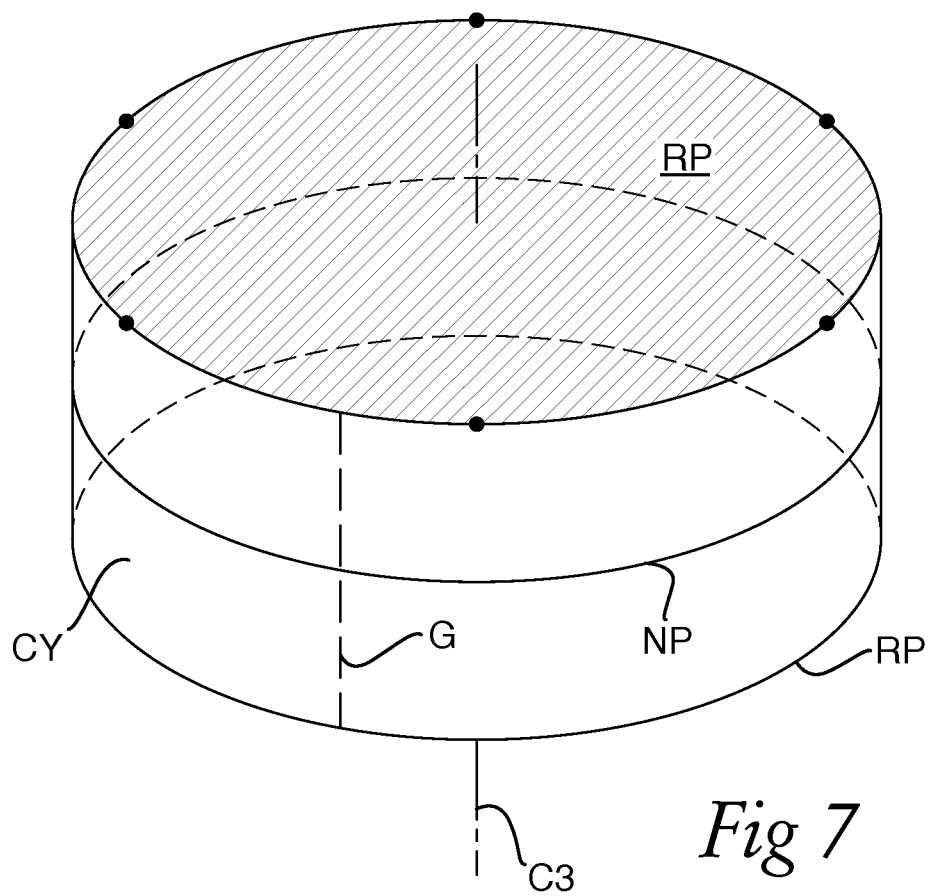
Figure 8:
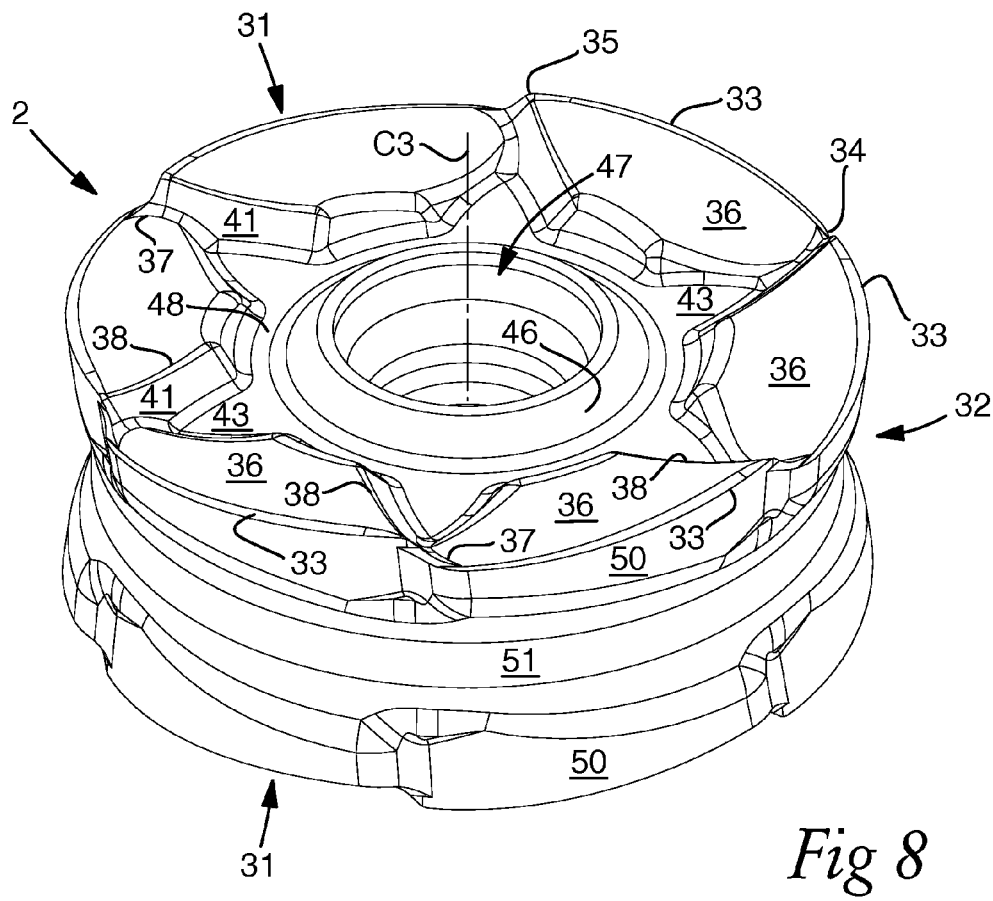
Figure 9:
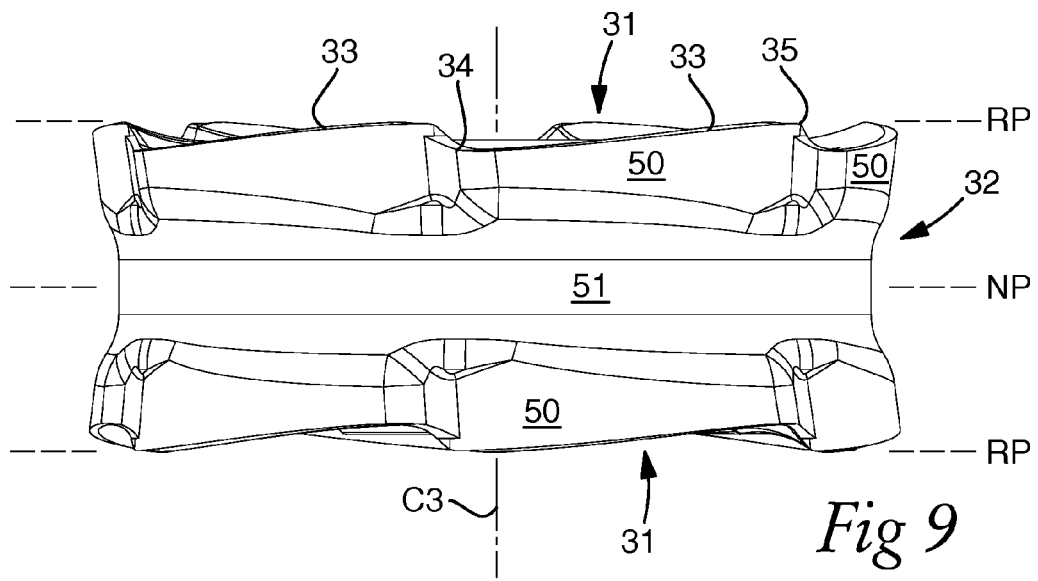
Figure 10:
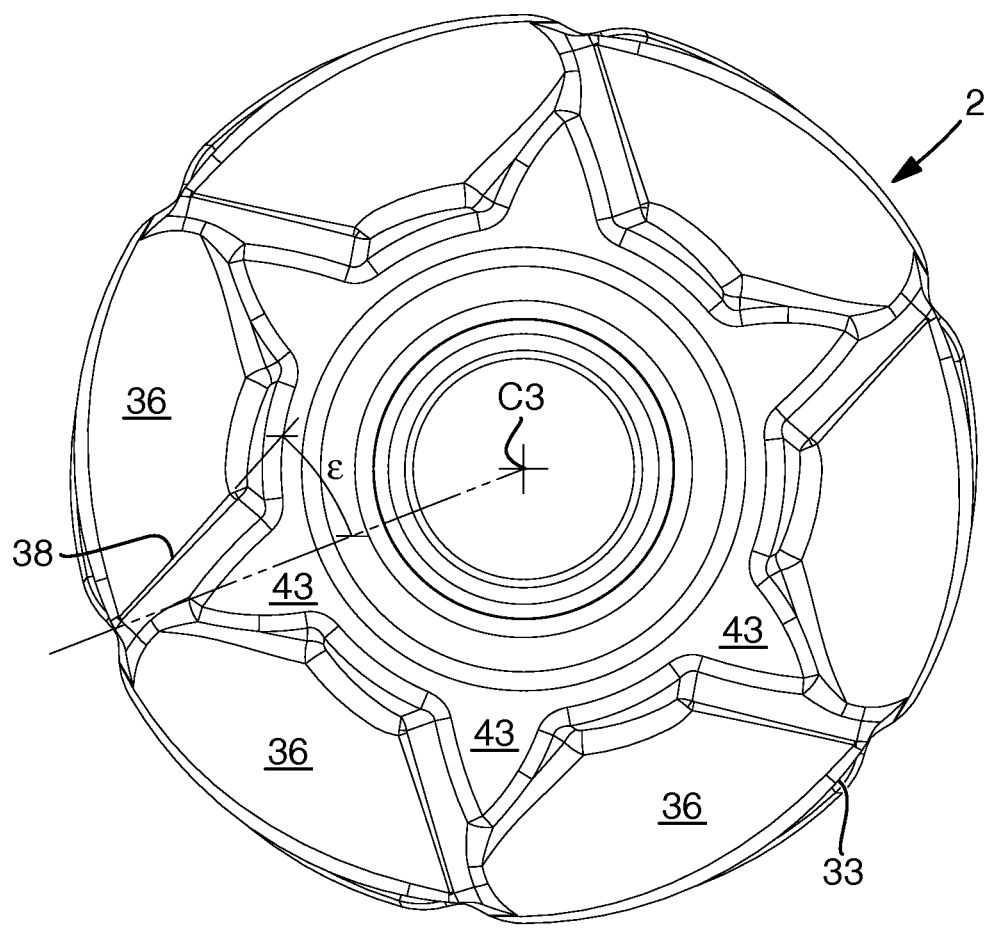
Figure 11:
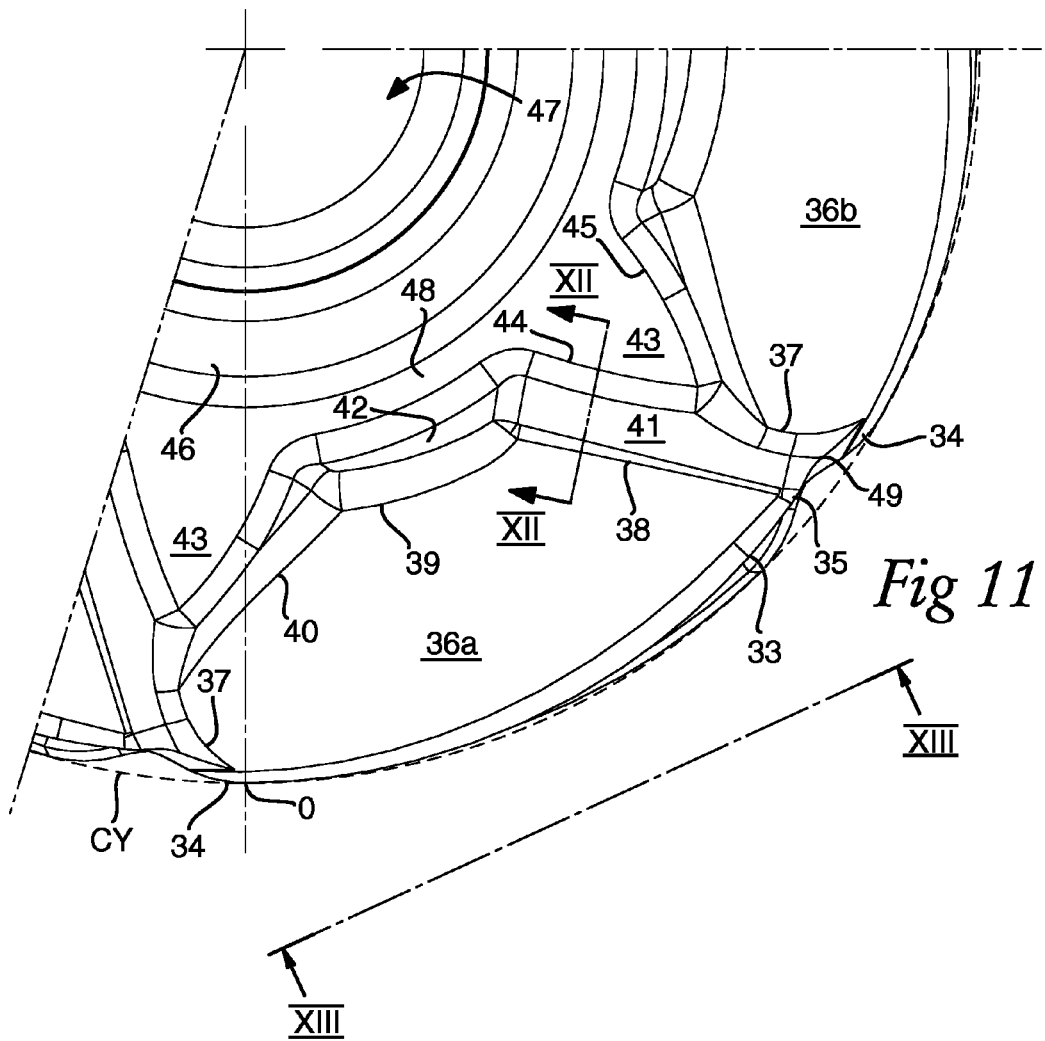
Figure 12:
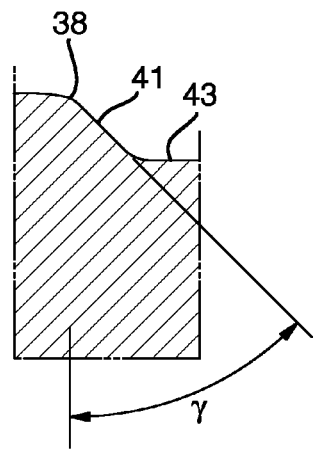
Figure 13:
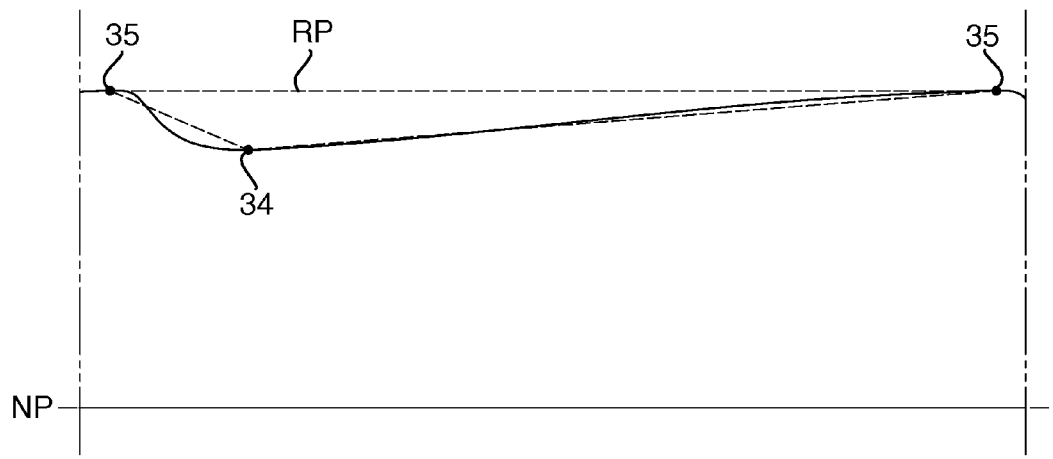
Figure 14:
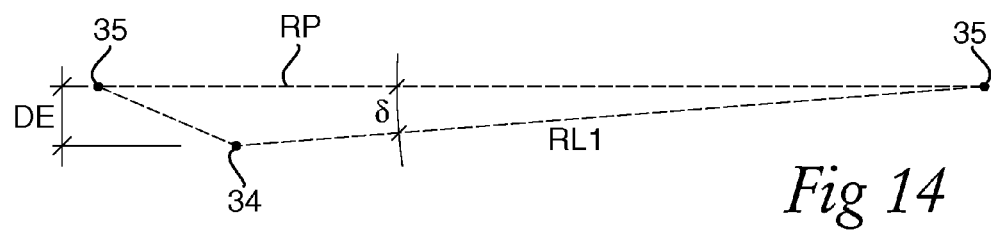
Figure 15:
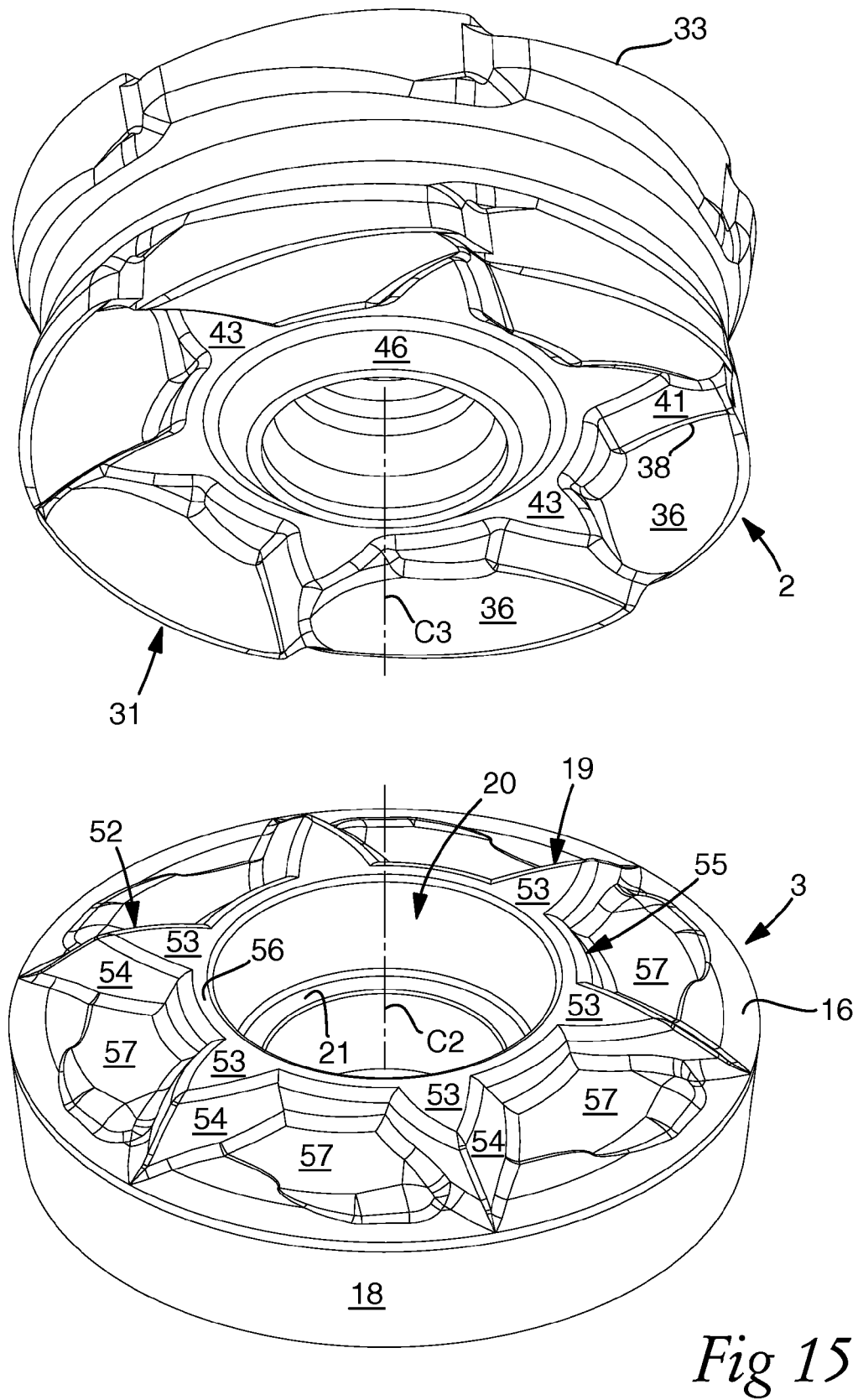
Figure 16:
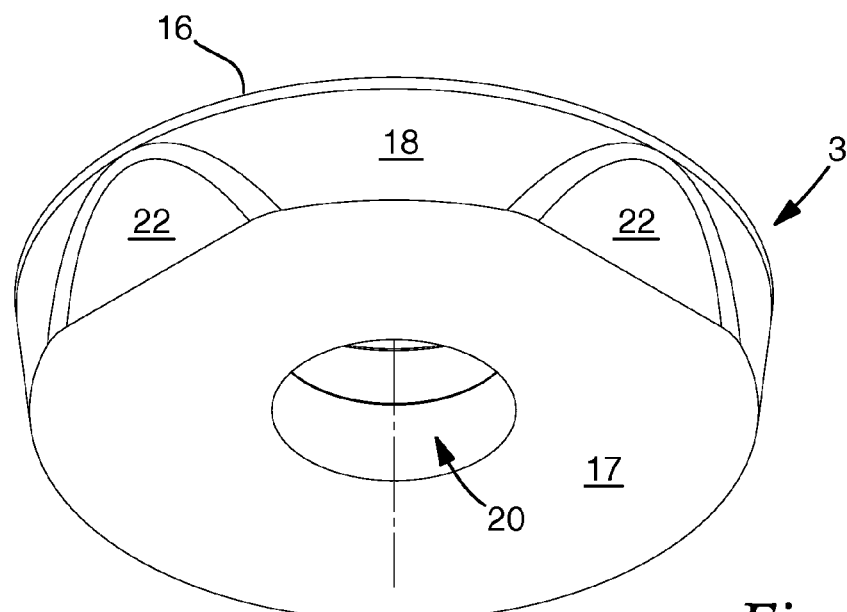
Figure 17:
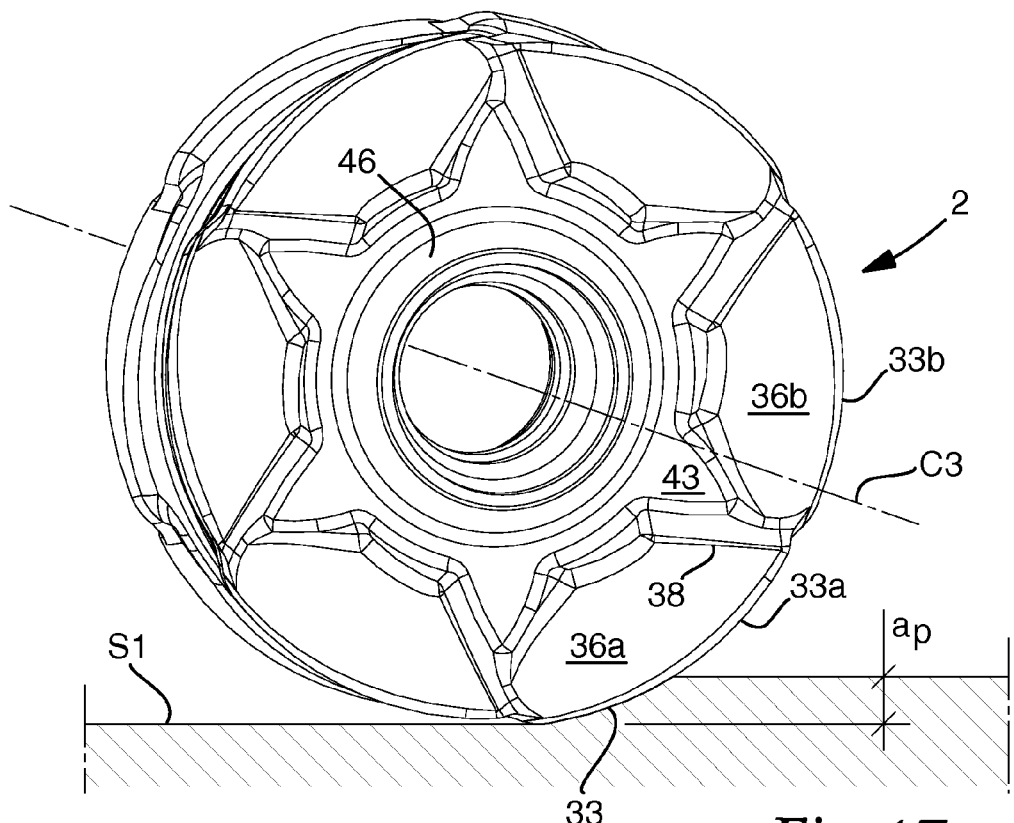
Figure 18:
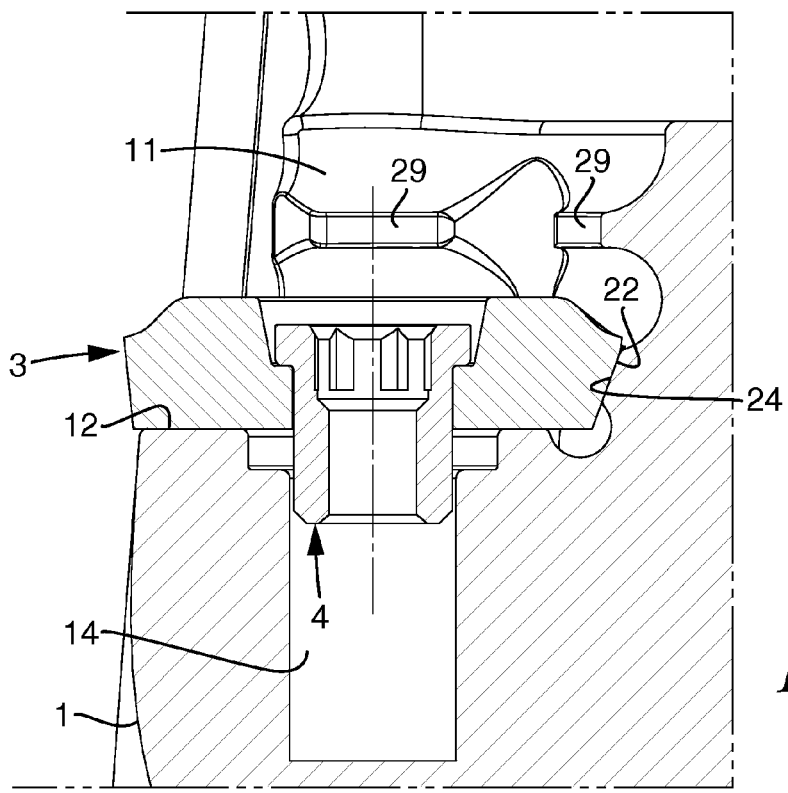
Figure 19:
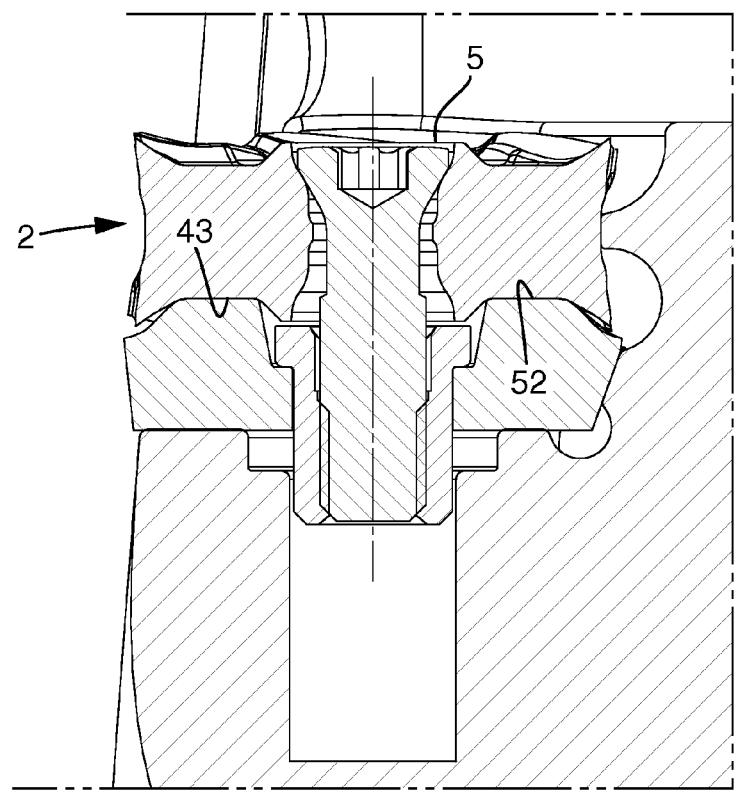
Figure 20:
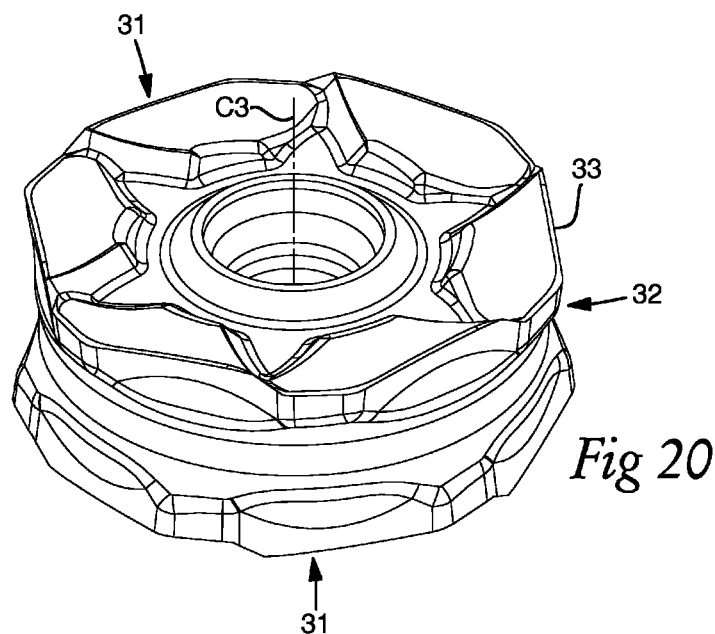
Figure 21:
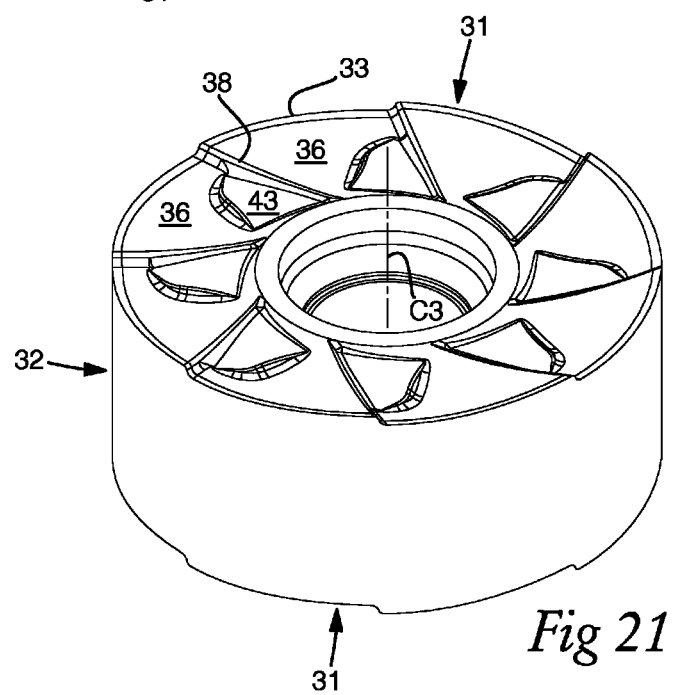

In the drawings:

FIG. 1 is a worm's eye view showing a milling tool having a basic body and a replaceable milling insert according to the invention in an assembled, operative state, FIG. 2 is a perspective exploded view showing the milling insert and a shim plate as well as two screws for the fixation of the same, separated from a seat in the basic body of the tool, FIG. 3 is an enlarged, perspective exploded view showing the shim plate, and a tubular screw for the same, separated from the seat in the basic body, FIG. 4 is a perspective view showing the shim plate mounted in the seat, FIG. 5 is a partly schematic detailed side view showing how the milling insert is tipped-in in an axially negative spatial position in the basic body, FIG. 6 is a detailed view showing the radially negative spatial position of the milling insert, FIG. 7 is an imaginary, geometrical figure having the purpose of facilitating the understanding of the nature of the milling insert, FIG. 8 is a perspective view showing above all the design of one of two identical chip faces included in the milling insert, FIG. 9 is a side view of the milling insert, FIG. 10 is a plan view of the milling insert, FIG. 11 is an enlarged, sector-shaped part of the planar view according to FIG. 10, FIG. 12 is an enlarged cross section XII-XII in FIG. 11, FIG. 13 a schematic detailed side view XIII-XIII in FIG. 11, FIG. 14 is a geometrical figure illustrating a pitch angle of an individual cutting edge included in the milling insert, FIG. 15 is an exploded view showing the milling insert in worm's eye view and a connecting surface included in the shim plate in bird's eye view, FIG. 16 is a worm's eye view of only the shim plate, FIG. 17 is a front view of only the milling insert in its tipped-in state during milling, FIG. 18 is an enlarged detailed section showing only the shim plate mounted in the seat of the basic body, FIG. 19 is an analogous detailed section showing also the milling insert mounted in the seat, FIG. 20 is a perspective view of a second, alternative embodiment of the milling insert according to the invention, and FIG. 21 is a perspective view of a third, alternative embodiment of the milling insert.

TERMINOLOGY

Before the invention is described in more detail, in order to provide conceptual clarity, certain fundamental concepts vital to the understanding of the invention should be made clear. Thus, the concept "chip face" relates to any one of the two ends of the milling insert, between which a circumferential clearance face extends. The individual chip face may either form an upper side or an under side in its mounted state in the seat of the basic body. In each chip face, there are included a plurality of individual part surfaces closest to each cutting edge. These part surfaces are denominated "chip surfaces". In the subsequent text, the concepts "invertible" and "indexable", respectively, are furthermore found. When the milling insert according to the invention is "inverted", this means that a previously upwardly exposed chip face is turned downward toward a bottom or connecting surface that is located in the seat and carries tangential forces, with the purpose of exposing the other chip face upward. When the milling insert is "indexed", this means that the same—after detachment—is rotated a bit on its own centre axis and then again is fixed in the seat. The object of inversion as well as indexing of the milling insert is, in the usual way, to change into an unused cutting edge, when a previously active cutting edge has been worn out. In doing so, each individual cutting edge should assume one and the same spatial position in relation to the basic body.

DETAILED DESCRIPTION OF A FEASIBLE EMBODIMENT OF THE INVENTION

In FIGS. 1-6, a milling tool is illustrated having a double-sided and indexable milling insert that is formed in accordance with the invention and has a round basic shape. The two fundamental components of the tool are a basic body 1, in the form of a so-called milling cutter head, and a replaceable milling insert 2. In the example shown, a shim plate 3 is also included as well as two screws, viz. a tubular screw 4 to fix the shim plate and a tightening screw 5 to fix the milling insert.

The basic body 1 includes front and rear ends 6, 7, between which there extends a centre axis C1 on which the same is rotatable, more precisely in the direction of the arrow R. From the rear end 7, a rotationally symmetrical envelope surface 8 extends that in this case transforms into the front end via a cross-sectionally circular bulge 9. A chip pocket, in its entirety designated 10, is countersunk in the envelope surface 8 and the bulge 9. Adjacent to the chip pocket 10, there is a seat generally designated 11. Already here, it should be mentioned that the seat 11 is delimited by a plane bottom surface 12 and a side wall that generally is designated 13 and has an arched basic shape.

In FIG. 3, it is seen that a hole 14 having a female thread 15 mouths in the bottom surface 12. The centre axis of said hole is designated C2. In this case, the shim plate 3 is generally round and includes an upper side 16, an under side 17 (see FIG. 16), as well as a rotationally symmetrical envelope surface 18. In the upper side 16, a connecting surface, in its entirety designated 19, is included, which is intended to co-operate with the downwardly facing chip face of the milling insert and which will be described in more detail below. A through hole 20 having an internal, ring-shaped shoulder surface 21 runs between the upper sides and under sides of the shim plate. The envelope surface 18 is slightly conical, more precisely in such a way that the same converges from the upper side 16 toward the under side 17. As is seen in FIG. 16, in the envelope surface 18, two plane locking surfaces 22 are formed, which run at an angle of 90° to each other. These locking surfaces 22 are intended to co-operate with two straight part surfaces 24 that are included in the side wall 13 of the seat (see FIG. 3) and likewise run at an angle of 90° to each other. In the example, the part surfaces 24 are cross-sectionally convex in order to provide line contact against the plane locking surfaces 22. In other words, the part surfaces 24 form side support surfaces for the shim plate 3. Between the part surfaces 24 and the bottom surface 12, there are fillets 25 that guarantee that the lower border edge of the shim plate 3 does not contact the side surface of the seat.

As is further seen in FIG. 3, the tubular screw 4 includes a male thread 26 in addition to a head 27. In the lower part of the inside of the tubular screw, there is a female thread (not visible), while the upper part includes a key grip 28 to allow tightening of the tubular screw. When this has been brought through the hole 20 in the shim plate and tightened with the male thread in engagement with the female thread 15 of the hole 14, the head 27 will, via the shoulder surface 21, press and fix the shim plate against the lower part of the seat. More precisely, the tubular screw 4 will press the under side 17 of the shim plate 3 against the bottom surface 12 of the seat at the same time as the locking surfaces 22 are pressed against the side support surfaces 24. In this state, the shim plate is fixed in a position in which the same cannot rotate, more precisely thanks to the contact between, on one hand, the locking surfaces 22 and, on the other hand, the straight side support surfaces 24. This means that the connecting surface 19 of the upper side 16 of the shim plate obtains an exact, predetermined spatial position in the basic body 1.

In connection with FIGS. 3 and 4, it should also be mentioned that the side wall 13 of the seat 11 includes two additional part surfaces 29, which are situated on a higher level than the side support surfaces 24 of the shim plate and separated from the same via grooves 30. Contrary to the straight part surfaces 24, the part surfaces 29 have a concavely curved shape in order to co-operate with convex, peripheral surface portions of the milling insert. In other words, the part surfaces 29 can serve as side support surfaces for the milling insert.

Although it is preferred to form the connecting surface 19 in a separate, replaceable shim plate 3, as shown in the example, it is within the scope of the invention also feasible to form the same directly in the basic body, viz. in the bottom of the seat 11. In the state shown in FIGS. 3 and 4, the centre axes of the shim plate 3 as well as of the tubular screw 4 coincide with the centre axis C2 of the hole 14, and therefore lack solitary designations.

Because the milling insert is double-sided, i.e., invertible, the seat in which the same is mounted must, as previously pointed out, assume a special tipping-in position in the basic body 1 for providing the requisite clearance behind the active, chip-removing cutting edge thereof. This position, which by those skilled in the art is denominated negative tipping-in position, is seen in FIGS. 5 and 6. Thus, in FIG. 5, it is shown how the active chip face of the milling insert leans axially forward/upward in the direction of rotation of the milling tool at an angle α. By this axially negative tipping-in angle, it is guaranteed that the milling insert clears from the generated surface, i.e., the surface S1 radially inside the milling insert (see also FIG. 17). An analogously radially negative tipping-in angle β is shown in FIG. 6. As a consequence of the milling insert also being radially tipped-in in this way, the clearance face of the milling insert will also clear from the arched surface S2 generated in the workpiece radially outside the plane surface S1.

Before the milling insert 2 as such is described in more detail, reference is made to FIG. 7, which shows an imaginary, geometrical figure having a round basic shape. In the figure, RP designates two identical, circular reference planes, between which there extends a cylinder CY concentric with a centre axis C3. The two reference planes RP extend perpendicular to the centre axis C3, implying that they are parallel to each other. They are also parallel to a neutral plane NP, from which the same are equidistantly spaced apart. In other words, the neutral plane NP is situated halfway between the reference planes RP. The cylinder CY consists of a surface of revolution that is assumed to be generated by a rectilinear generatrix G parallel to the centre axis C3. It should be pointed out that the reference plane RP shown at the top of in FIG. 7 is screened in order to provide a sense of space in the figure. The peripheries of the two reference planes RP are circles that form boundary lines against the cylinder CY.

Reference is now made to FIGS. 8-14, which more in detail illustrate the concrete design of the milling insert 2. As may be best seen in FIGS. 8 and 9, the milling insert 2 includes two opposite chip faces 31, between which a circumferential clearance face extends, generally designated 32. The situation of the chip faces is defined by the aforementioned reference plane RP, more precisely in such a way that homologous points situated highest along the periphery of the chip face touch the individual reference plane. Therefore, the chip faces are generally—in spite of their irregular topography—geometrically parallel to each other and to the neutral plane NP. The round or cylindrical shape is defined by the fact that the above-mentioned cylinder CY is touched by such homologous points or loci along the periphery of the individual chip face that are radially most spaced apart from the centre axis C3 of the milling insert. The topographic shape of the respective chip face 31 is identical and of such a nature that a plurality of identical cutting edges generally designated 33 are formed along the periphery of the individual chip face. In the example, the number of cutting edges 33 amounts to six, i.e., each cutting edge occupies an arc angle of 60°.

Each cutting edge 33 rises axially at a certain, acute pitch angle from a first, essentially point-shaped end 34 (see FIG. 9) toward a second end 35, the first one 34 of which is situated lowest and the second one 35 situated highest. More precisely, all highest end points 35 touch commonly the reference plane RP. Radially inside the individual cutting edge 33, there is a chip surface designated 36 following the shape of the cutting edge by rising from a lower or lowest situated boundary line 37 toward a higher situated boundary line 38, which forms a crest on the chip surface (see FIGS. 8 and 11). In the direction radially inward, in this case, the chip surface 36 is delimited by two boundary lines 39, 40, which like the cutting edge successively rise from the first or lower boundary line 37 toward the higher situated crest 38. Via the crest 38, the chip surface 36 transforms into a declining shoulder surface 41, which falls at a considerably steeper steep angle than the pitch angle of the chip surface 36.

In each chip face 31, in addition, a plurality of bearing surfaces 43 are included (see FIGS. 8 and 11), which are wedge-shaped (or flat iron-like) and located between pairs of adjacent chip surfaces 36, which in FIG. 11 have been supplemented with the suffixes a, b to be distinguishable. The wedge-shaped contour of the individual shoulder surface 43 is determined by two boundary lines 44, 45, which converge in the direction outward toward the periphery of the chip face.

The wedge-shaped bearing surfaces 43 are plane and, in the embodiment shown, present between all pairs of adjacent chip surfaces 36. In other words, each chip face includes in this case six active bearing surfaces 43.

In the example shown, between the chip surfaces 36 and a ring-shaped border 46 (see FIGS. 8 and 11) around a through hole 47 through the milling insert, there is in addition arranged a ring-shaped bearing surface 48 to which the wedge-shaped shoulder surfaces 43 are connected, all surfaces 43, 48 being situated in a common plane so as to together form a single continuous bearing surface having a corona-like shape. In the example, the individual bearing surfaces 43 are countersunk not only in relation to the crests 38 of the chip surfaces but also in relation to the lowest situated boundary lines 37 of the chip surfaces. In other words, the chip surfaces 36 are entirely situated on a higher level than the bearing surfaces 43/48. It should also be noted that the boundary line 44 of the bearing surfaces 43 (see FIG. 11) that run along the shoulder surface 41 is shorter than the crest 38, the radially outer portion of the shoulder surface 41 connecting to the rear boundary line 37 of the adjacent chip surface 36b.

In FIG. 12, γ designates the steep angle at which the shoulder surface 41 declines or falls away from the crest 38 toward the bearing surface 43. In the example, this angle γ amounts to 45°, but may vary upward as well as downward, however most suitably downward. A small angle γ means that the shoulder surface 41 declines fairly steeply and occupies only a small part of the total projection area of the chip face. This means that the smaller γ is, the greater the bearing surface 43 portion of the entire projection area can be made.

As viewed in plane elevation according to FIG. 11, in this case, the cutting edge 33 is arched. However, the arc-shape does not coincide with the generally round shape of the milling insert, such as this is defined by the imaginary cylinder CY, in that the cutting edge 33 successively propagates inward from the cylinder CY in the direction from the first end 34 toward the second end 35. In such a way, a transition ridge 49 between the second end 35 of the chip surface 36a and the first end 34 of the chip surface 36b will be located entirely inside the cylinder CY. Therefore, the so-called zero point of the cutting edge (see "six o'clock" in FIG. 11) is located near the first end 34 of the active cutting edge without the transition between this cutting edge and the one following next interfering with the generated, plane surface (see the surface S1 in FIG. 17).

In the exemplified embodiment, the milling insert 2 has a double positive macro geometry so far that the circumferential clearance face 32 includes two clearance surfaces 50 (see FIGS. 8 and 9) that are generally conical and diverge from a waist 51 situated in the neutral plane NP toward the peripheries of the two chip faces 31, i.e., toward the cutting edge lines of the cutting edges 33.

Reference is now made to FIGS. 13 and 14, in which RL1 designates a straight reference line between those two points that define the first and second ends 34, 35 of the individual cutting edge 33. In relation to the reference plane RP, which touched by the end points 35, the reference line RL1 forms an angle δ that is the pitch angle of the cutting edge between the ends 34, 35. In FIG. 14, the depth at which the first end point 34 of the cutting edge is situated under the reference plane RP is designated DE. This depth DE should amount to at least 5% and at most 15% of the thickness of the milling insert calculated as the axial distance between the reference planes RP. The pitch angle δ varies depending on the depth DE as well as the length of the cutting edge between the end points 34, 35. However, should amount to at least 1° and at most 15°.

With reference to FIG. 10, wherein the milling insert is shown in plane elevation, it should be pointed out that the contour shape of the individual chip surface 36 partly is determined by the boundary line 38 that constitutes the crest of the chip surface. In FIG. 10, a periphery angle between the boundary line 38 and a straight line between the centre axis C3 of the milling insert and the outer end of the boundary line 38 is designated ε. In the example, ε amounts to approx. 27°. If ε is increased, the area of the adjacent bearing surface 43 may be increased at the expense of the area of the chip surface 38, and vice versa. In order to locate the bearing surface 43 in as protected a position as possible, ε should not be more than 40°. On the other hand, ε should amount to at least 15° to guarantee that the bearing surface 43 becomes sufficiently large to guarantee a stable support of the milling insert in the seat.

The individual chip surface 36 may be plane, but also arched. In particular, the same may be given a concavely arched shape defined by radial generatrices, which extend toward the cutting edge 33, being arched with a diminutive rise. In such a way, the chip surface takes on the nature of a shallow chute, along which the chips are guided radially inward toward the crest 38 rather than radially outward.

Reference is now made to FIG. 15, which illustrates the interface between the downwardly facing chip face 31 of the milling insert 2 and the connecting surface 19 included in the shim plate 3. In the connecting surface 19, there are included an equally large number of lugs 52 as the number of bearing surfaces 43 in the chip face 31 of the milling insert. The lugs 52 have approximately the same wedge-shape as the bearing surfaces 43 and are individually defined by a tapering, upper support surface 53 as well as by two flank surfaces 54. All lugs 52 are connected to a common, ring-shaped collar 55, which surrounds the hole 20 of the shim plate and includes a plane, ring-shaped upper surface 56 that, together with the wedge-shaped support surfaces, 53 forms a single continuous, corona-like support surface, against which the corresponding bearing surface 43/48 of the chip face of the milling insert can abut. Between adjacent lugs 52, plane valley surfaces 57 situated in a common plane extend. The level difference between the support surfaces 53 and the valley surfaces 57 is greater than the level difference between the bearing surfaces 43 and the crests 38 along the chip surfaces 36 of the milling insert. Therefore, when the milling insert rests with its bearing surfaces 43 against the support surfaces 53 of the shim plate, the chip surfaces 36 and the connecting cutting edges 33 will clear from the valley surfaces 57. In this connection, one flank 54 of the individual lug 52 will serve as a stop surface, against which the individual shoulder surface 41 adjacent to the crest 38 of the chip surface 36 can be pressed, and in such a way prevent rotation of the milling insert in relation to the connecting surface. In other words, the flanks 54 and the shoulder surfaces 41 serve as co-operating lock means for the rotational securing of the milling insert.

In FIG. 18, the shim plate 3 is shown mounted in the seat 11 in the basic body 1. In this state, the tubular screw 4 is tightened in the female thread 15 in the hole 14 that mouths in the bottom surface 12 of the seat, the under side of the shim plate being held pressed against the bottom surface 12 at the same time as the locking surfaces 22 are held pressed against the side support surfaces 24 in the seat. In this state, the side support surfaces 29 for the milling insert 2 are freely exposed above the shim plate 3.

In FIG. 19, also the milling insert 2 is shown mounted in the seat, more precisely by means of the screw 5, which has a male thread that is tightened into the female thread of the tubular screw 4. In this state, the bearing surfaces 43 of the downwardly facing chip face of the milling insert are pressed against the support surfaces 53 of the lugs 52. Simultaneously, the chip surfaces 36 and the cutting edges 33 clear from the valley surfaces 57 (not visible in FIG. 19) positioned between the lugs. The waist 51 of the milling insert may either be pressed in direct contact with the side support surfaces 29 in the seat, or be located extremely near the same (play <0.01 mm) so as to, if required, be able to rest against the same.

THE FUNCTION AND ADVANTAGES OF THE INVENTION

When a chip flow is produced along the active cutting edge of the milling insert—more precisely by the fact that the chips curl along the connecting chip surface—the chips will be transmitted along the successively rising chip surface and leave the same via above all the crest, and to a certain extent also the inner boundary lines, without impinging on neither the bearing surfaces of the same, active chip face nor the inactive cutting edges that are tangentially spaced-apart from the active cutting edge. In other words, the bearing surfaces as well as the unused cutting edges are protected from the detrimental impact of the chips. When the milling insert after that is inverted, it is guaranteed that the bearing surfaces that are pressed against the support surfaces on the lugs of the connecting surface are plane, smooth and undamaged. This vouches for a stable clamping of the milling insert in the intended, exact spatial position in the basic body.

Brief Description of Further Embodiments of the Invention

In FIG. 20, an alternative embodiment of the milling insert according to the invention is shown. This embodiment differs from the preceding one essentially only in that the cutting edges 33 are straight instead of convexly arched. However, the basic shape of the milling insert is still round so far that the radially outermost points along the periphery of the chip face that are homologous touch the imaginary cylinder CY according to FIG. 7. Also the waist of the clearance face of the milling insert has a cylindrical shape.

The third, alternative embodiment according to FIG. 21 differs from the preceding ones in that the cutting geometry thereof is negative, i.e., the clearance face 32 is cylindrical and lacks a waist. Furthermore, the bearing surface 43 of the individual chip face 31 is still countersunk in relation to the crest 38 along an adjacent chip surface 36. However, the same bearing surface 43 is elevated in relation to the chip surface 36 that surrounds the same, i.e., the bearing surface is situated on an intermediate level between the chip surface 36 and the crest 38.

Feasible Modifications of the Invention

The invention is not limited only to the embodiments described above and shown in the drawings. Thus, it is feasible to fix the milling insert in another way than by means of exactly a tightening screw, e.g. a clamp or the like. Furthermore, the connecting surface requisite for the co-operation with the downwardly facing chip face of the milling insert may be formed directly in the basic body instead of in a separate shim plate, as exemplified above.

The invention claimed is:

1. A milling tool comprising:
   a basic body including front and rear ends between which there extends a first centre axis on which the basic body is rotatable and with which an envelope surface is concentric;
   a seat formed with a connecting surface and situated in a transition between the envelope surface and the front end; and
   a double-sided, indexable milling insert having two rake faces separated along a second centre axis and perpendicular to the same, wherein the rake faces are equidistantly separated from a neutral plane and between which there extends a clearance face that, in transitions to the rake faces, together with the same, forms peripheral cutting edges, the connecting surface of the seat being located in a tipped-in spatial position in the basic body, in which position an axial tipping-in angle, as well as a radial angle are negative to provide a clearance behind an active cutting edge of the milling insert, and the milling insert being clamped in the seat by a tightening device and rotationally secured in one of several index positions by co-operating lock means in a rake face of the milling insert and the connecting surface in the seat, wherein the milling insert is formed with a plurality of cutting edges tangentially spaced-apart along the periphery of an individual rake face and axially with respect to the second centre axis of the milling insert, which individually rise at an acute pitch angle from a first end toward a second end, wherein a rake surface is positioned radially inside one of the cutting edges and follows the cutting edge by rising from a lower boundary line to a crest, such that when a chip flow is produced along the active cutting edge the chips are transmitted along the successively rising rake surface and leave the same via the crest, via which the rake surface transforms into a declining shoulder surface, which is pressed against a stop surface included in the connecting surface of the seat, wherein, together with the connecting surface forms said lock means, and wherein bearing surfaces, included in the individual rake face of the milling insert, are situated between pairs of adjacent-rake surfaces on a different level and pressed against support surfaces included in the connecting surface of the seat and formed on lugs, each one including a stop surface between which valley surfaces extend, a level difference between the crest of the rake surface and an-individual bearing surface of the milling insert being smaller than a level difference between the support surface of the lug and a neighbouring valley surface in order to keep the rake surfaces of the milling insert spaced apart from the valley surfaces of the connecting surface.

2. The milling tool according to claim 1, wherein the individual bearing surface of the milling insert is formed adjacent to a shoulder surface and countersunk in relation to the crest.

3. The milling tool according to claim 2, wherein the individual bearing surface of the milling insert is also countersunk in relation to the lower boundary line of an adjacent rake surface.

4. The milling tool according to claim 1, wherein the individual bearing surface of the milling insert is wedge-shaped and delimited by boundary lines that converge toward the periphery of the rake face, the support surface on the lug of the connecting surface also being wedge-shaped and delimited by boundary lines that converge in a radially outward direction.

5. The milling tool according to claim 1, wherein the axial level difference between a crest included in the rake face of the milling insert and a first, lower boundary line to a rake surface is at least 5% and at most 15% of the thickness of the milling insert calculated between two opposite rake faces.

6. The milling tool according to claim 1, wherein the individual shoulder surface of the milling insert declines at a steep angle that, in arbitrary sections transverse to the crest, is at most 50°.

7. The milling tool according claim 1, wherein the individual bearing surfaces of the milling inserts between the rake surfaces are planar and situated in a common plane parallel to the neutral plane of the milling insert, and wherein the support surfaces on the lugs of the connecting surface are planar and situated in a common plane.

8. The milling tool according to claim 1, wherein the number of lugs of the connecting surface and the number of individual bearing surfaces, which are situated between adjacent rake surfaces of the milling insert, are equal to the number of rake surfaces of the milling insert.

9. The milling tool according to claim 1, wherein the connecting surface of the seat is formed in an upper side of a shim plate, which is semi-permanently connected to the basic body.

10. The milling tool according to claim 9, wherein the shim plate is fixed to the body by a tubular screw that extends through a hole in the same, the screw including a male thread, which is tightened in a female thread in a hole in a bottom in the seat, and a female thread, in which there is tightened a male thread of a tightening screw extending through a hole in the milling insert.

11. The milling tool according to claim 9, wherein the shim plate has a round basic shape and includes a conical envelope surface that converges from the upper side of the shim plate toward an underside thereof.

12. The milling tool according to claim 11, wherein in the envelope surface of the shim plate, there are formed two plane locking surfaces that run at an angle to each other and are pressed against two side support surfaces in the seat running at the same angle in relation to each other.

13. The milling tool according to claim 9, wherein the milling insert and the shim plate are manufactured from cemented carbide, while the basic body is manufactured from steel.

14. A double-sided, indexable milling insert comprising:
two rake faces separated along a centre axis and perpendicular to the same, the rake faces being equidistantly separated from a neutral plane between which there extends a clearance face that transitions to the rake faces, and together with the same, forms peripheral cutting edges, each of the rake faces including lock means for rotationally securing the milling insert in one of several index positions;
a plurality of tangentially spaced-apart cutting edges formed along the periphery of each of the rake faces, which individually rise axially at an acute pitch angle from a first end toward a second end; and
a rake surface positioned radially inside an individual cutting edge, the rake surface following the cutting edge by rising from a lower boundary line to a crest, such that when a chip flow is produced along an active cutting edge the chips are transmitted along the successively rising rake surface and leave the same via the crest, via which the rake surface transforms into a declining shoulder surface forming the lock means, and that each of the rake faces include an individual bearing surface, which is situated between pairs of adjacent rake surfaces and on a different level from the same.

15. The milling insert according to claim 14, wherein the individual bearing surface is adjacent to a shoulder surface and is shorter than the same and countersunk in relation to said crest.

16. The milling insert according to claim 15, wherein the bearing surface is countersunk in relation to a surrounding rake surface.

17. The milling insert according to claim 14, wherein a periphery angle between the crest and a straight reference line extending between the centre axis and a radially outer end of the crest is at least 10°.

18. The milling insert according to claim 14, wherein the bearing surface is wedge-shaped and delimited by two boundary lines that converge toward the periphery of the rake face.

19. The milling insert according to claim 14, wherein the pitch angle of the cutting edge extending between the neutral plane and a straight reference line between the two ends of the cutting edge is at least 1° and at most 15°.

20. The milling insert according to claim 14, wherein the axial level difference between a crest of a first rake surface and the lowest boundary line to an adjacent rake surface is at least 5% and at most 15% of the thickness of the milling insert.

21. The milling insert according to claim 14, wherein a steep angle of the shoulder surface, in arbitrary sections transverse to a crest is at most 50°.

22. The milling insert according to claim 14, wherein bearing surfaces extend between pairs of rake surfaces, the bearing surfaces being planar and located in a common plane parallel to the neutral plane.

23. The milling insert according to claim 22, wherein the number of bearing surfaces is equal to the number of rake surfaces.

24. The milling insert according to claim 22, further comprising an endless, ring-shaped and plane surface located radially inside of the bearing surface and situated in the same plane as the bearing surface that together with the same, forms a continuous, corona-like bearing surface.

25. The milling insert according to claim 14, further comprising a double positive macro geometry formed by a clearance face having two conical clearance surfaces that diverge from the neutral plane toward the peripheries of the rake faces.

* * * * *